US005933789A

United States Patent [19]
Byun et al.

[11] Patent Number: 5,933,789
[45] Date of Patent: Aug. 3, 1999

[54] METHOD AND SYSTEM FOR APPLYING DISPERSIVE NORMAL MOVEOUT CORRECTIONS TO SEISMIC SURVEY SIGNALS

[75] Inventors: Bok S. Byun; David D. Thompson, both of Plano; E. Stuart Nelan, Dallas, all of Tex.

[73] Assignee: Atlantic Richfield Company, Los Angeles, Calif.

[21] Appl. No.: 08/745,452

[22] Filed: Nov. 12, 1996

[51] Int. Cl.$^6$ ...................................................... G06F 19/00
[52] U.S. Cl. ................................. 702/17; 367/48; 367/52; 702/13
[58] Field of Search ..................... 702/14, 17, 13; 367/48, 52

[56] References Cited

U.S. PATENT DOCUMENTS 5,684,754  11/1997  Byun et al. ................................ 702/17

OTHER PUBLICATIONS

Dix, "Seismic Velocities from Surface Measurements", *Geophysics,* vol. XX, No. 1 (1955), pp. 68,86.
Taner and Koehler, "Velocity Spectra—Digital Computer Derivation and Applications of Velocity Functions", *Geophysics,* vol. 34, No. 6 (1969), pp. 859,881.
Shapiro, et al., "Frequency–Dependent Anisotropy of Scalar Waves in a Multilayered Medium", *J. Seismic Exploration,* vol. 3 (1994), pp. 37–52.

*Primary Examiner*—Donald E. McElheny, Jr.
*Attorney, Agent, or Firm*—Anderson, Levine & Lintel

[57] ABSTRACT

A method and computer system for deriving and applying normal moveout phase and time shift corrections to seismic survey traces is disclosed. Normal moveout time-shift corrections are first applied to traces in a common midpoint (CMP) or common depth point (CDP) gather, based upon stacking velocity analysis applied to envelopes of the traces. One offset in the survey, preferably the maximum offset, is selected as the reference point; the NMO time shift at this reference offset is then selected as a reference NMO time-shift. The traces in the gather are each phase-shifted based upon iterated reference phase dispersion values at the reference offset, times the ratio of the normal moveout time-shifts for the trace in the gather to that of the reference offset (raised to a power). Semblance analysis is performed to identify, for each point in normal incidence time and thus for each reflective event, the optimum reference phase dispersion value. Phase corrections, based upon the optimum reference phase dispersion value as a function of normal incidence time multiplied by the ratio of the normal moveout trace and reference time shifts, are then applied to the traces in the gather. Interpolation may be used to define the optimum reference phase dispersion for CMP gathers lying between the midpoints of analyzed gathers.

25 Claims, 10 Drawing Sheets

METHOD AND SYSTEM FOR APPLYING DISPERSIVE NORMAL MOVEOUT CORRECTIONS TO SEISMIC SURVEY SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of exploration for oil and gas reservoirs, and is more specifically directed to the analysis of seismic survey signals obtained in such exploration.

The use of seismic survey techniques is commonplace in the prospecting for subsurface reservoirs of hydrocarbons such as oil and gas. As is fundamental in the art, seismic surveys are typically obtained by imparting acoustic energy into the earth, either at a land surface or into the water in a marine survey, and detecting the energy at other surface or marine locations away from the source. The detectors sense the arrival of the acoustic energy after reflection from subsurface strata and interfaces, such that the time delay between the imparting of energy by the source and its receipt by the detectors will be indicative of the depth below the earth surface at which the reflecting interface is located. Conversion of the time-domain reflection signals into depth will thus provide a survey of the subsurface geology.

FIG. 1 illustrates a conventional land-based seismic survey, in which a reflective geological interface is present in the earth between subsurface strata 2, 4, along which a particular depth point DP of interest for this description is located. Of course, many depth points will be analyzed along this and other interfaces in a typical survey. As is evident from FIG. 1, multiple source-receiver pairs will impart energy to and receive reflected energy from depth point DP, at varying angles. The so-called "zero-offset" source receiver pair $S_0$, $R_0$ corresponds to the case where both the source and detector are directly above depth point DP (i.e., there is no offset distance between receiver $R_0$ and the surface location directly over depth point DP); typically, the zero-offset signal is not actually obtained, but is instead extrapolated from the non-zero offset traces. Source-receiver pairs $S_1$, $R_1$; $S_2$, $R_2$; $S_3$, $R_3$ similarly respectively impart energy to and receive reflected energy from depth point DP at varying angles and thus at varying offsets.

A well-known technique in the art for eliminating random noise from the survey signals is referred to as common midpoint (CMP), or common depth point (CDP), gather and stack. In this technique, the signals from each source-receiver path having the same depth point, such as depth point DP in FIG. 1, are selected from the survey data, forming a group of traces known as a CMP (or, equivalently, CDP) gather. Elimination of random noise is then performed by summing the traces in the gather into a "stack". This summation will tend to reinforce the signal portion of the traces corresponding to the reflection event, which should be common among all traces having the same reflection midpoint, while the random noise will tend to cancel in the summation.

However, the traces in the CMP gather of FIG. 1 generally have different reflection times for energy reflected from the same reflection point DP, considering that their source-receiver paths are of different length. For example, the distance along which energy must travel from source $S_3$ to receiver $R_3$ is much greater than the distance along which energy must travel in the near-offset pair $S_1$, $R_1$, due to the larger angle from the vertical of the path of energy from source $S_3$ to receiver $R_3$. In the case of FIG. 1, the trace recorded by receiver $R_1$ for energy reflecting from depth point DP would be considered as a relatively near offset signal as compared to the trace recorded by receiver $R_3$ for energy reflecting from the same depth point DP. In the time-domain seismic traces recorded by receivers $R_1$ and $R_3$, the time at which energy reflected from depth point DP will appear in the trace for receiver $R_3$ will be later than the time at which energy reflected from depth point DP is indicated in the trace for nearer-offset receiver $R_1$.

The time-domain effect of varying offset must be taken into account in the CMP stack process in order for the signal portions of traces of varying offset to properly align and provide an accurate indication of the depth of the reflector. This is typically handled by way of "normal moveout correction", or NMO (also NMOC), in which the traces corresponding to source-receiver paths of various lengths are time-shifted relative to one another so that their detected reflection events are aligned in time. The amount of the time shift for a given trace will, of course, depend upon its offset distance and upon the velocity with which the acoustic energy travels in the strata along the shot-receiver path. Normal moveout correction therefore requires the estimation or determination of a velocity, commonly referred to as the "stacking" velocity, for deriving the necessary time shift as a function of offset. The relationship between offset and the NMO time correction $\Delta T_x$, for a given seismic reflection event in a seismic trace, follows the well-known Dix equation:

$$(T_0 + \Delta T_X)^2 = T_0^2 + \frac{X^2}{V_g^2}$$

where $T_0$ is the zero offset reflection time of the reflection, X is the offset distance of the trace being corrected, $V_g$ is the stacking velocity for the reflection event, and where $\Delta T_x$ is the NMO time shift for the reflection event in the trace being corrected.

Conventional derivation of the stacking velocity $V_g$ for NMO correction is typically done in a "best-fit" manner to optimize the accuracy of the correction among all of the traces in the gather. For example, a series of corrections based upon multiple trial stacking velocities may be applied to a gather of traces. Semblance, or correlation, analysis is then applied among the traces over limited time windows (corresponding to the localities of individual reflection events), and plotted as a function of time $T_0$ and velocity $V_g$. The best-fit stacking velocities for each event are then selected at the values yielding the highest semblance value, resulting in a stacking velocity time function $V_g(T_0)$. NMO correction may then be readily applied to each reflection event in each trace, using the stacking velocity function derived from the semblance analysis.

Other conventional techniques for deriving the NMO correction include constant velocity gather (CVG) and constant velocity stack (CVS) analysis. These techniques assume that the seismic velocity is constant along the paths associated with the same reflection interface, and calculate the NMO correction for each trace as a function of two-way time. The best NMO correction may then be readily selected as that which shows a flat reflector over a series of traces of varying offset for each CMP gather.

The accuracy of these conventional approaches in deriving and applying NMO correction depends upon the fidelity of the reflection signal across the traces in the CMP gather. In particular, conventional NMO techniques rely upon reflection signals in the traces having substantially the same phase, so that sufficient signal correlation will be present among the traces to provide meaningful selection of the proper NMO correction. It has been observed, however, in connection with the present invention, that seismic waves are distorted not only in time and amplitude as a function of offset, but are also distorted in phase during propagation through the subsurface.

FIG. 2 illustrates an example of phase distortion as a function of offset in a seismic survey. Trace $S_n$ is a near-offset trace illustrating a reflection event $E_n$ that is centered about a two-way time T. Reflection event $E_n$ exhibits a high positive amplitude that is symmetric about time T, and as such provides a strong reflection signal. Trace $S_f$ is a far-offset trace in the same CMP gather as trace $S_n$, and as such has a reflection event $E_f$ caused by energy reflecting from the same subsurface reflector as reflection event $E_n$ of trace $S_n$. As expected for trace $S_f$, which is at a larger offset distance than trace $S_n$, reflection event $E_f$ appears at a delayed time $T+\Delta T$; in this example, $\Delta T$ corresponds to the relative NMO time-shift correction that would be applied to trace $S_f$ prior to stacking it with trace $S_n$.

As exhibited in FIG. 2, however, not only is reflection event $R_f$ delayed in time from reflection event $E_n$, but reflection event $E_f$ also has significant phase distortion relative to reflection event $E_n$, such that its positive amplitude pulse lags its central point in time at time $T+\Delta T$. As a result, the simple stacking of trace $S_f$ with trace $S_n$ would result in a distorted stacked signal; this offset-dependent phase distortion, especially when present on many traces in a CMP gather, also adversely affects the determination of the proper stacking velocity and the NMO correction itself. Accordingly, phase distortion has been observed to significantly degrade the signal-to-noise ratio of seismic surveys.

In the frequency domain, the dispersive phase behavior of seismic signals over frequency has a frequency-dependent slope that is also dependent upon the two-way time, as is well known. Referring now to FIG. 3, an exemplary dispersive phase spectrum $\Phi_0(f)$ for a zero-phase shift signal is illustrated. This zero-phase shift spectrum $\Phi_0(f)$ may be approximated as a linear function of frequency, expressed as:

$$\hat{\Phi}_0(f)=(-2\pi)f\Delta T_x$$

where $\Delta T_x$ is the NMO correction from zero for the particular trace. Accordingly, the slope of the dispersive phase spectrum is proportional to the NMO correction for the trace.

The effects of phase distortion in a seismic trace discussed above may also be seen in FIG. 3. Spectrum $\Phi_A(f)$ is the dispersive phase spectrum of a trace in which a zero-frequency phase shift $\Phi_A(0)$ is present; trace $S_f$ of FIG. 2 is an example of such a trace. The slope of linearly-approximated spectrum $\hat{\Phi}_A(f)$ is the same as in the case of zero-phase shift approximated spectrum $\hat{\Phi}_0(f)$ in other words, the correct NMO time-shift correction that is to be applied to the trace is independent of phase.

However, as noted above, conventional NMO correction techniques assume that no offset-dependent phase shift exists and thus, with reference to FIG. 3, assumes that the dispersive phase spectrum passes through the origin of the phase-frequency plot. As a result, conventional NMO correction techniques can produce different NMO correction values for the same event of the same trace, depending upon the dominant frequency considered. For example, if the trace and event giving rise to spectrum $\Phi_A(f)$ of FIG. 3 is analyzed at frequency $f_1$, a slope $NMOC_1$ is found that passes through the origin; analysis at frequency $f_2$ gives a different, flatter, slope $NMOC_2$ for this same event and trace. Not only do the slopes, or corrections, $NMOC_1$, $NMOC_2$ differ depending upon the frequency of analysis, but neither of the corrections that are derived using a zero-phase shift assumption for a phase-shifted event provide an accurate NMO correction.

It is therefore an object of the present invention to provide a method of normal moveout correction that accounts for offset-dependent phase shifts in seismic signals.

It is a further object of the present invention to provide such a method that enables subsequent data stacking and migration to be correct over a wider frequency band.

It is a further object of the present invention to provide such a method that may be implemented into an automated system.

By way of further background, it is well known, as described in Shapiro et al., "Frequency-dependent anisotropy of scalar waves in a multilayered medium", *J. Seismic Exploration*, 3 (1994), pp. 37–52, that layer stratification in formations such as shale and limestone causes anisotropic attenuation of acoustic energy, such that the attenuation of the energy by the formation is dependent upon the angle of incidence.

It is therefore a further object of the present invention to provide a method of analyzing phase dispersion of reflected energy in such a manner as to assist in the interpretation of the composition of a reflecting stratum.

Other objects and advantages of the present invention will be apparent to those of ordinary skill in the art having reference to the following specification together with its drawings.

BRIEF SUMMARY OF THE INVENTION

The present invention may be implemented into a computer system and method of operating the same to apply corrections to seismic signals in a survey. The method operates upon gathers of seismic traces of energy reflected from a common depth point, at varying offset, preferably after normal moveout time correction. Reference phase shifts at a reference offset (e.g., the maximum offset in the survey) are determined for each reflection event in the seismic traces. According to a preferred embodiment of the invention, each trace in the gather may be modified by a phase shift derived by the reference phase shift multiplied by the ratio of the trace offset to the reference offset (the ratio being taken to a selected power), with semblance analysis then performed to identify the reference phase shift that provides optimum phase correction for each reflection event in the gather. Each trace in the gather is then modified by a phase operator derived from the optimum phase correction, which may be a function of time depending upon the results of the semblance analysis.

BRIEF DESCRIPTION OF THE SEVERAL VIEWS OF THE DRAWING

The file of this patent contains at least one drawing executed in color. Copies of this patent with color drawings will be provided by the Patent and Trademark Office upon request and payment of the necessary fee.

DETAILED DESCRIPTION OF THE INVENTION

As will be evident from the following description, the present invention is applicable to seismic survey signals that are acquired in the conventional manner from either land-based or marine surveys. As is well known according to the art, seismic surveys may be of the two-dimensional (2-D) type, in which the seismic source is incrementally moved along a line that is parallel from a line of receivers, to obtain survey signals corresponding to a line of midpoints. Three-dimensional (3-D) surveys are also well known in the art, and are obtained through use of at least one array of receivers arranged in multiple parallel lines, with source energy imparted at varying locations and varying offsets from the arrays of receivers. The present invention, while described relative to 2-D surveys, is also applicable to 3-D seismic surveys. It is contemplated that those of ordinary skill in the art are familiar with conventional techniques of data acquisition in seismic surveys of the 2-D- and 3-D type, in both the marine and land environments.

Figure 4:
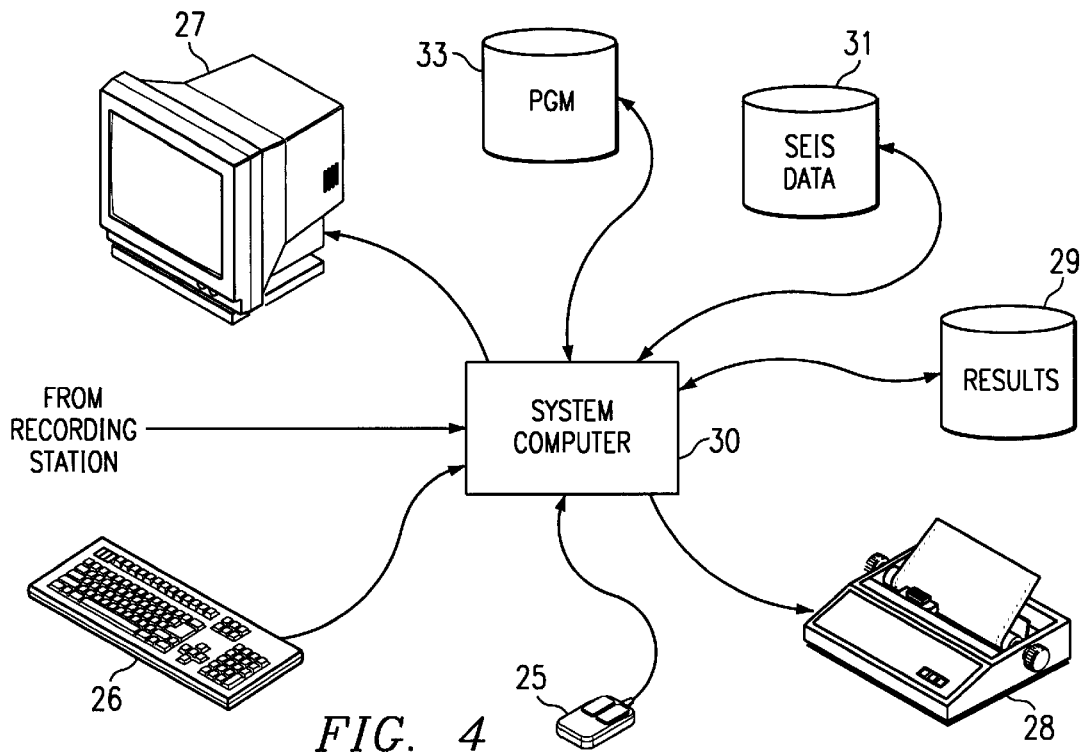
FIG. 4 is a computer system into which the preferred embodiment of the invention may be implemented.

Referring now to FIG. 4, a computer system into which the preferred embodiment of the invention may be implemented will be described. This system includes system computer 30, which may be implemented as any conventional personal computer or workstation, for example a SPARCstation available from Sun Microsystems Inc., implemented either in standalone fashion or as part of a network arrangement. System computer 30 is in communication with disk storage devices 29, 31, and 33, which are preferably external hard disk storage devices in a network. It is contemplated that disk storage devices 29, 31, 33 may be either directly connected to system computer 30, or indirectly accessible by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic data from a recording station, such as may be in situ at the survey locations, are received by system computer 30 and, after conventional formatting and other initial processing, stored on disk storage device 31. System computer 30 will then retrieve the appropriate data from disk storage device 31 in order to perform the processing described hereinbelow. This operation by system computer 30 is controlled by a sequence of program instructions, written in the form of a computer program (e.g., in C++ or in another suitable language) and stored in counter-readable memory, such as program disk storage device 33 of FIG. 4; of course, the memory medium storing the computer program may be of any conventional type used for the storage of computer programs, including hard disk drives, floppy disks, CD-ROMs and other optical media, magnetic tape, and the like.

According to the preferred embodiment of the invention, system computer 30 presents output onto graphics display 27, or alternatively via printer 28; further in the alternative, system computer 30 may store the results of the analysis described hereinbelow on disk storage device 29, for use in further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 is typically located at a data center remote from the survey region.

Figure 5:
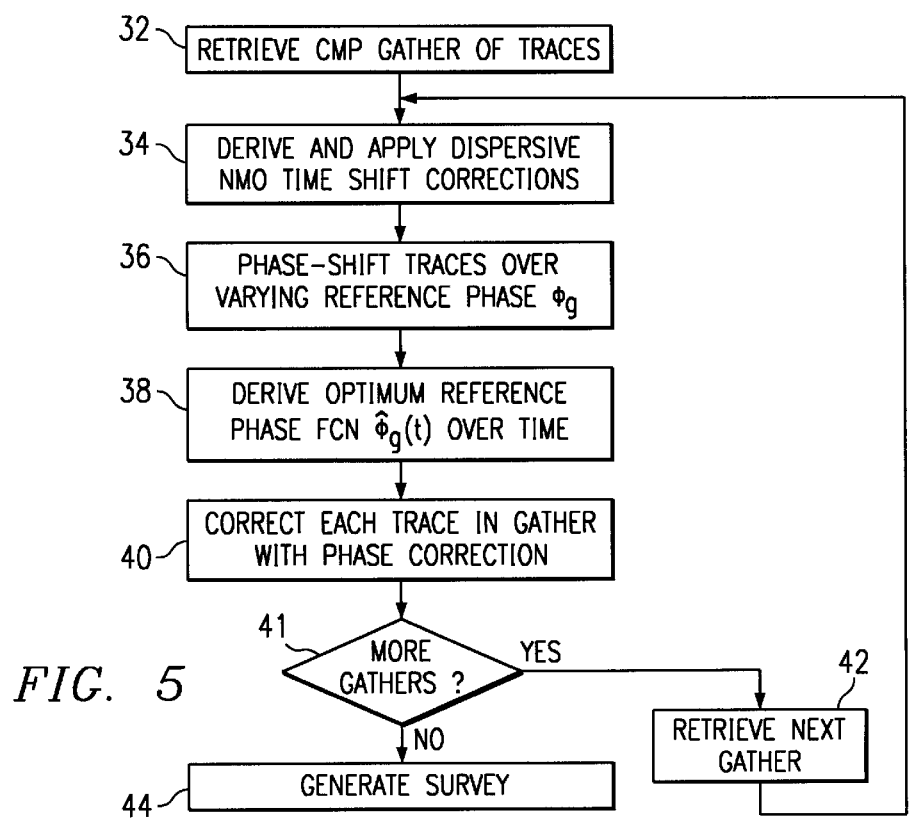
FIG. 5 is a flow chart illustrating the method according to the preferred embodiment of the invention.

According to the preferred embodiment of the invention, a method of operating the computer system of FIG. 4 to interpret horizons from seismic signals detected in a conventional seismic survey, of either the 2-D or 3-D type and performed in either a marine or land-based setting, will now be described relative to FIG. 5.

Figure 1:
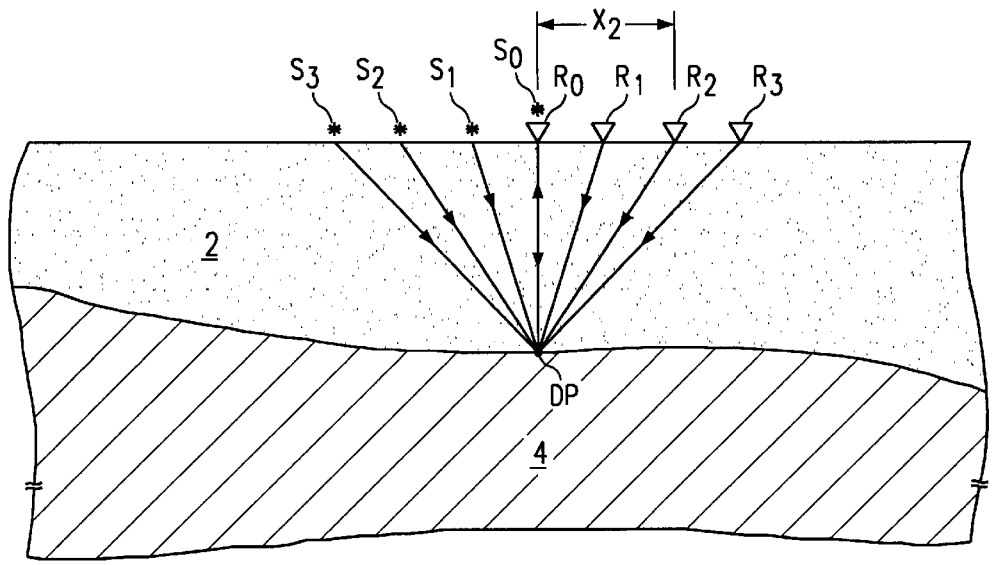
FIG. 1 is a cross-sectional view of a portion of the earth illustrating the acquisition of seismic survey signals in a conventional manner.

The method according to the preferred embodiment of the invention begins with process 32, in which system computer 30 retrieves, from memory, digital data corresponding to a group of traces having a common midpoint; accordingly, the traces retrieved in process 32 are referred to as a common midpoint (CMP) gather. An example of a CMP gather would be the traces detected by receivers $R_1$ through $R_3$ in response to energy imparted at source locations $S_1$ through $S_3$ illustrated in FIG. 1. It is contemplated that the number of individual traces in a typical CMP gather may range from 120 to 240, with offset distances x, measured from the zero-offset midpoint location as illustrated by way of offset $x_2$ of receiver $R_2$, ranging from 3000 to 5000 meters in modern surveys, depending upon the depth of the target reflector. Since the system of FIG. 4 operates upon discrete digital data, the traces retrieved in process 32 are sequences of discrete values. However, for purposes of the present description, the traces retrieved in process 32 will be referred to traces S(t), indicating their physical nature as signals of detected acoustic energy over time.

Following retrieval of the current CMP gather in process 32, according to the preferred embodiment of the present invention, process 34 is next performed to apply normal moveout time shift corrections to the traces in the CMP gather. Dispersive NMO correction process 34 according to the preferred embodiment of the invention is then performed to apply dispersive normal moveout correction to envelope seismic traces, rather than to actual seismic traces, as will now be described.

As discussed above, NMO is conventionally performed by the determination of a stacking velocity $V_g$, or more generally, a stacking velocity time function $V_g(T_0)$ considering that the stacking velocities may vary with zero-offset time of the reflection event, to account for variations in the acoustic velocities over different subsurface strata at the various depths. Dispersive NMO correction is performed by applying a time shift $\Delta T_x$ to each envelope trace for that reflection event, depending upon its offset distance X and the stacking velocity $V_g$, through use of the well-known Dix equation:

$$(T_0 + \Delta T_X)^2 = T_0^2 + \frac{X^2}{V_g^2}$$

where $T_0$ is the zero offset reflection time of the reflection, typically based upon an extrapolation.

Figure 2:
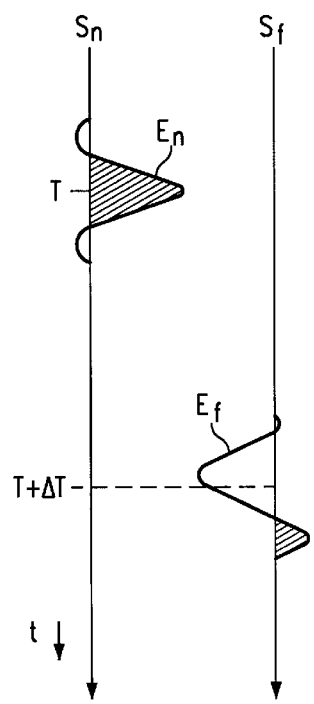
FIG. 2 is a plot of two exemplary seismic signal traces over time, at near and far offsets, illustrating the effects of offset-dependent phase distortion.
Figure 3:
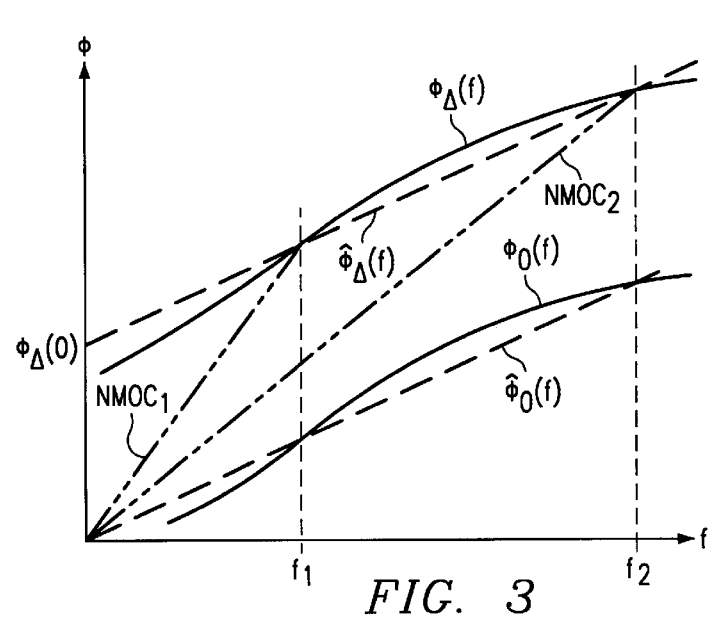
FIG. 3 is a plot of phase versus frequency for ideal and phase-shifted traces, illustrating a source of error in conventional normal moveout correction techniques.

According to the preferred embodiment of the invention, the stacking velocity analysis and NMO correction of process 34 is performed upon the envelope function of each trace, rather than upon the trace itself, to mitigate the effect of phase dispersion over offset. As is well known in the art, the envelope function env{S(t)} of a trace S(t) corresponds to the following definition:

$$\text{env}\{S(t)\} = \sqrt{[S(t)]^2 + [Hi\{S(t)\}]^2}$$

where Hi{S(t)} is the Hilbert transform of the trace S(t). The envelope function is a well-known function used in the analysis of time-varying signals, such as seismic traces. In particular, the envelope function eliminates the effects of phase distortion from the traces in the derivation of the NMO time shift correction in process 34, such phase distortion being substantial in some instances, such as described hereinabove relative to FIG. 2.

The NMO time shifts from reflecting surfaces from different subsurface layers (and combinations) will of course have different stacking velocities. As such, the dispersive NMO correction for a given trace will apply a stacking velocity function $V_g(T_0)$ that varies with two-way travel time $T_0$. As noted hereinabove, conventional derivation of the stacking velocity functions $V_g(T_0)$ for NMO correction is typically done in a "best-fit" manner to optimize the accuracy of the correction among all of the traces in the gather, for example by way of semblance analysis as described in Taner and Koehler, "Velocity Spectra—Digital Computer Derivation and Applications of Velocity Functions", *Geophysics*, Vol. 34, No. 6 (December 1969), pp. 859–881. Other conventional techniques for generating the NMO correction in process 34 may alternatively be used.

Process 34 thus derives NMO correction time shifts $\Delta T_x$ for each trace S(t), by performing conventional NMO analysis, typically including the derivation of a stacking velocity function $V_g(T_0)$ based upon a best-fit velocity analysis over the set of envelopes env{S(t)} of the traces S(t) in the CMP gather. Upon determining the stacking velocity function $V_g(T_0)$, the NMO time-shift correction $\Delta T_X$ for each trace (more explicitly, the time-shift correction function $\Delta T_X(T_0)$ for each trace) may be readily derived by way of the Dix equation or other NMO model relationship (e.g., Taylor series expansion and the like). The NMO time-shift correction $\Delta T_X(T_0)$ is then applied to its associated trace S(t) and the corrected trace is stored in memory (either disk storage 29, 31, or in system RAM, as appropriate). According to the preferred embodiment of the invention, each trace S(t) will also have the value of its time shift $\Delta T_X$, or its time-shift correction function $\Delta T_X(T_0)$, also stored in memory in association therewith, as these time-shifts will be used in determining phase corrections according to the preferred embodiment of the present invention as described hereinbelow. The performance of NMO correction of process 34 for all the traces in the gather projects these traces S(t) into the zero-offset time domain, in the known manner.

It should be noted that NMO correction process 34 may be performed later in the method, for example after the phase corrections from the phase dispersion analysis process to be described hereinbelow have been applied to the traces S(t). However, it has been observed that the generation of the phase correction is preferably performed in the zero-offset time domain, both for ease in identification of the appropriate phase corrections and also as proper dispersive NMO time-shift corrections are necessary to derive the phase corrections as will be described hereinbelow.

Figure 6:
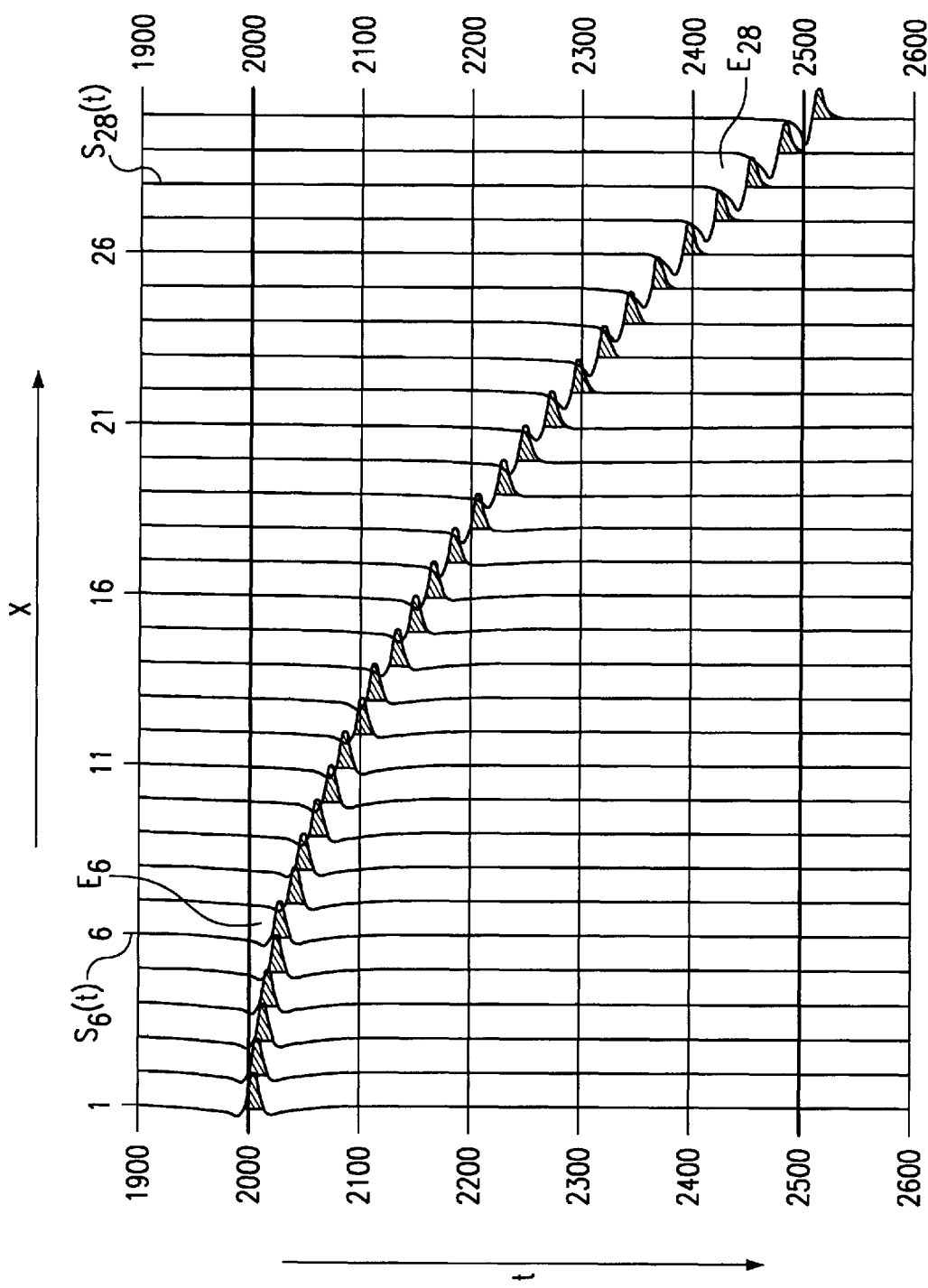
FIG. 6 is a plot illustrating the time and phase relationship among a CMP gather of traces.

According to the preferred embodiment of the present invention, systematic offset-dependent phase dispersion is present upon reflections from a common reflection point that have different subsurface path lengths, as in the case of a CMP gather of traces. FIG. 6 illustrates the relationship among a CMP gather of traces (prior to the application of NMO time shift correction as performed in process 34). For example, trace $S_6(t)$ is an exemplary near-offset trace, relative to far-offset trace $S_{26}(t)$. As evident from FIG. 6, event $E_{28}$ of trace $S_{26}(t)$ has a significant phase shift (evidenced by its negative amplitude leading portion) relative to event $E_6$ of trace $S_6(t)$, which is generated by the same reflector. Inspection of the exemplary CMP gather of FIG. 6 illustrates that the phase shift increases in a systematic manner with increasing offset x.

This systematic phase dispersion $\phi_x$ of a given trace may be approximated relative to the phase shift $\phi_g$ of a reference trace having an NMO time-shift correction $\Delta T_{X_{ref}}$ as follows:

$$\varphi_X = \varphi_g \left[ \frac{\Delta T_X}{\Delta T_{X_{ref}}} \right]^\beta$$

where $\Delta T_X$ is the NMO time-shift correction of the trace under analysis. The exponent $\beta$ determines the offset-dependency of the phase dispersion $\phi_X$, and thus may vary; it has been observed, however, that linear dependency ($\beta=1$) is sufficient for most surveys.

The offset of each trace in a CMP gather is of course known from the location of the receivers and shot locations in the survey. As a result, in order to select the proper phase dispersion $\phi_X$ for each trace in the gather, one must determine the proper value of reference phase dispersion $\phi_g$ for a reference offset. For example relative to FIG. 6, if trace $S_{28}(t)$ were selected as a reference trace, reference phase shift $\phi_g$ would be the phase shift of event $E_{28}$ relative to zero-offset, and reference time-shift $\Delta T_{xref}$ would be set equal to the NMO time-shift correction of trace $S_{28}(t)$ determined in process 34. The phase shift $\phi_x$ at others of the traces in the gather of FIG. 6 can then be derived according to the relationship between phase shift $\phi_x$ and reference phase shift $\phi_g$ noted hereinabove.

Of course, the dispersive normal offset behavior in actual surveys is not ideal. According to the preferred embodiment of the invention, therefore, the reference phase shift $\phi_g$ of a reference trace (typically a far offset trace) must be selected for each reflector in the CMP gather in such a way as to optimize the coherence of the resulting corrections. According to the preferred embodiment of the invention, a reference phase function $\phi_g(t)$ is derived for each CMP gather in the survey by way of an iterative dispersive normal moveout best fit analysis, so that the optimal value of reference phase $\phi_g$ is selected for each reflective event in the gather. Each trace $S_i(t)$ in the gather may then be corrected for phase, according to the relationship noted hereinabove.

Figure 7:
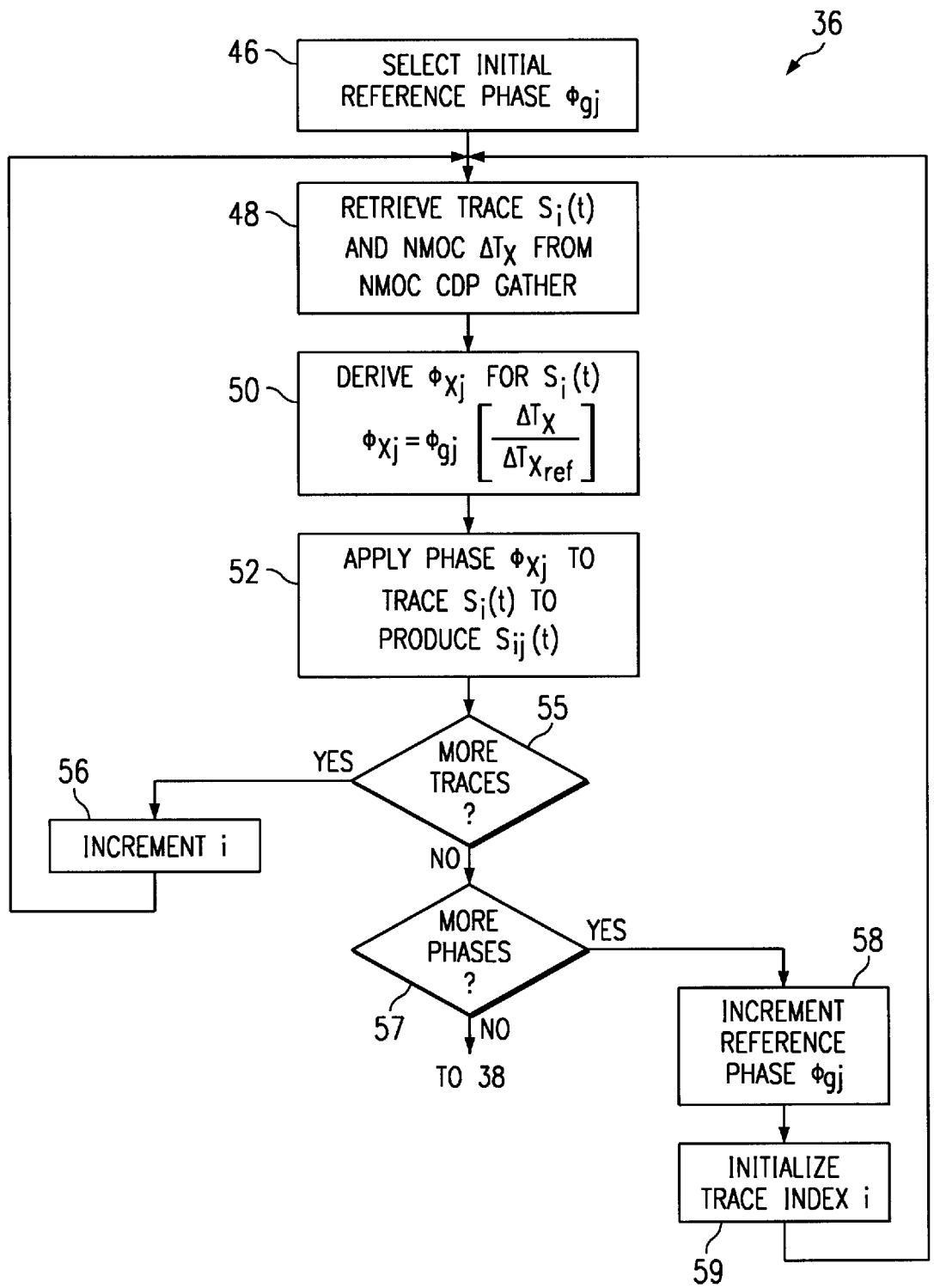
FIG. 7 is a flow chart illustrating the method of transforming traces in the CMP gather over a range of reference phase angles according to the preferred embodiment of the invention.

According to the preferred embodiment of the present invention, dispersive normal moveout analysis begins with process 36, in which system computer 30 generates iterative phase-shifted versions of each of the zero-offset time domain traces S(t) in the CMP gather, phase-shifted in a manner dependent upon a series of iterated trial reference phases $\phi_g$ varying over a range from within which the optimal reference phase shift may be selected. Referring next to FIG. 7, process 36 according to the preferred embodiment of the invention will now be described in detail.

Phase-shift process 36 begins, in process 46, with the selection of an initial iterated reference phase $\phi_{gj}$ for a trace $S_{ref}(t)$; the NMO time-shift of trace $S_{ref}(t)$ determined in process 34 is used as the reference time-shift $\Delta T_{xref}$. Trace $S_{ref}(t)$ is preferably the farthest-offset trace in the entire profile. The initial iterated reference phase $\phi_{gj}$ may be set at either the minimum or maximum of the phase angle range of investigation. While the discrete iterated reference phases $\phi_{gj}$ may range over all possibilities, the range may be limited, for practical purposes, to between −360° and +360°.

Process 48 is next performed, by way of which system computer 30 retrieves a first trace $S_i(t)$ of the CMP gather from memory. Trace $S_i(t)$, as noted above, is preferably in the zero-offset time domain after NMO correction process 34, and has a known NMO time-shift $\Delta T_x$. Accordingly, in process 50, system computer 30 next derives the phase shift $\phi_{xj}$ for trace $S_i(t)$ based upon the selected reference phase $\phi_{gj}$ and the NMO time-shift $\Delta T_x$, according to the relationship:

$$\varphi_{Xj} = \varphi_{gj} \left[ \frac{\Delta T_X}{\Delta T_{Xref}} \right]$$

The exponent β in this embodiment of the invention is assumed to be unity; of course, other values of β may be readily incorporated into the calculation of process 50. This phase shift $\phi_{xj}$ is then applied to trace $S_i(t)$ by system computer 30 in process 52, generating a new trace $S_{ij}(t)$ including a phase-shift based upon the iterated reference phase $\phi_{gj}$. The phase-shift of process 52 may be performed by system computer 30 according to the formula:

$$S_{ij}(t)=S_i(t)\cos(\phi_{Xj})+Hi\{S_i(t)\}\sin(\phi_{xj})$$

where $Hi\{S_i(t)\}$ is the Hilbert transform of the trace $S_i(t)$.

Decision 55 is then performed by system computer 30 to determine if additional traces remain to be processed in the current CMP gather; if so (decision 55 is YES), the trace index i is incremented in process 56, and control passes to process 48 for retrieval of the next trace $S_i(t)$ and its processing by processes 50, 52, 54. Upon phase shifting of each trace $S_i(t)$ in the CMP gather for the reference phase $\phi_{gj}$ (decision 55 is NO), decision 57 is next performed by system computer 30 to determine if additional iterations of the reference phase $\phi_{gj}$ remain to be processed. If so (decision 57 is YES), the iterated reference phase $\phi_{gj}$ is incremented in process 58, and the trace index i is initialized in process 59, following which the first trace $S_i(t)$ in the CMP gather is retrieved in process 48 and the phase shift processes 50, 52, are repeated for each trace $S_i(t)$ in the CMP gather at the new iterated reference phase $\phi_{gj}$. Upon completion of processing for the gather (decision 57 is NO), a series of phase-shifted traces $S_{ij}(t)$ are stored in memory for each original trace $S_i(t)$ in the CMP gather, each series having an envelope representation for each iterated value of reference phase $\phi_{gj}$.

Referring back to FIG. 5, process 38 is next performed by system computer 30, by way of which the optimum reference phase $\phi_g$ is selected for each reflection event indicated in the current CMP gather. The selection of process 38 is preferably made in a manner corresponding to the phase-shifting operation applied in process 36. According to the preferred embodiment of the invention, in which process 36 generated and stored the phase-shifted traces $S_{ij}(t)$, phase-shifted by amounts derived from iterated reference phases $\phi_{gj}$, selection process 38 will now be described relative to FIG. 8.

Process 38 begins with system computer 30 retrieving from memory, in process 60, the phase-shifted traces $S_{ij}(t)$ for traces i=1 to n (n being the number of traces in the CMP gather), for one iterated reference phase $\phi_{gj}$. After the retrieval of process 60, process 62 is performed by system computer 30 to evaluate a semblance coefficient at multiple time and reference phase coordinates (t, $\phi_{gj}$), over a window of selected size in the arrangement of the phase-shifted traces $S_{ij}(t)$. The semblance analysis performed in process 62 according to this embodiment of the invention is intended to quantify the extent to which the phase-shifted (and NMO corrected) traces in the gather resemble one another over the selected time window; as such, it is preferred that the selected window include all traces in the gather.

The semblance coefficient calculated in process 62 may be generated in the conventional manner for semblance analysis. For example, the semblance may be calculated for each phase-shifted trace $S_{ij}(t)$ in the same manner as used in the determination of the stacking velocity $V_s$ in conventional NMO processing, as described in the above-referenced article by Taner and Koehler, at p. 880. This semblance value, as applied in process 62, is a sum of the energy of the stacked trace of phase-shifted traces $S_{ij}(t)$ within window W, normalized by a stack of the traces $S_{ij}(t)$ squared (i.e., $\Sigma\{[S_{ij}(t)]^2\}$, to eliminate phase effects therein). In this example, therefore, the semblance value determined in process 62 is in the range between 0 and 1, and is stored by system computer 30 in association with the center normal incidence time t of window W for the reference phase shift $\phi_{gj}$. Process 62 continues by moving time window W in normal incidence time, preferably including each phase-shifted trace $S_{ij}(t)$ in each determination of the semblance value for the iterated reference phase $\phi_{gj}$, until the semblance has been derived over all times of interest.

Following process 62, decision 63 is performed to determine if additional iterated reference phase shifts $\phi_{gj}$ remain to be processed in the semblance analysis. If so, process 64 increments to the next iterated reference phase $\phi_{gj}$ and the semblance analysis of processes 60, 62 is repeated. Upon completion of the semblance analysis for all iterated reference phases $\phi_{gj}$ (decision 63 is NO), control passes to process 66 in which system computer 30 plots (on output device 28 or upon graphics display 27) or otherwise analyzes the semblance values over time and over reference phase $\phi_{gj}$ for the current CMP gather.

Figure 9:
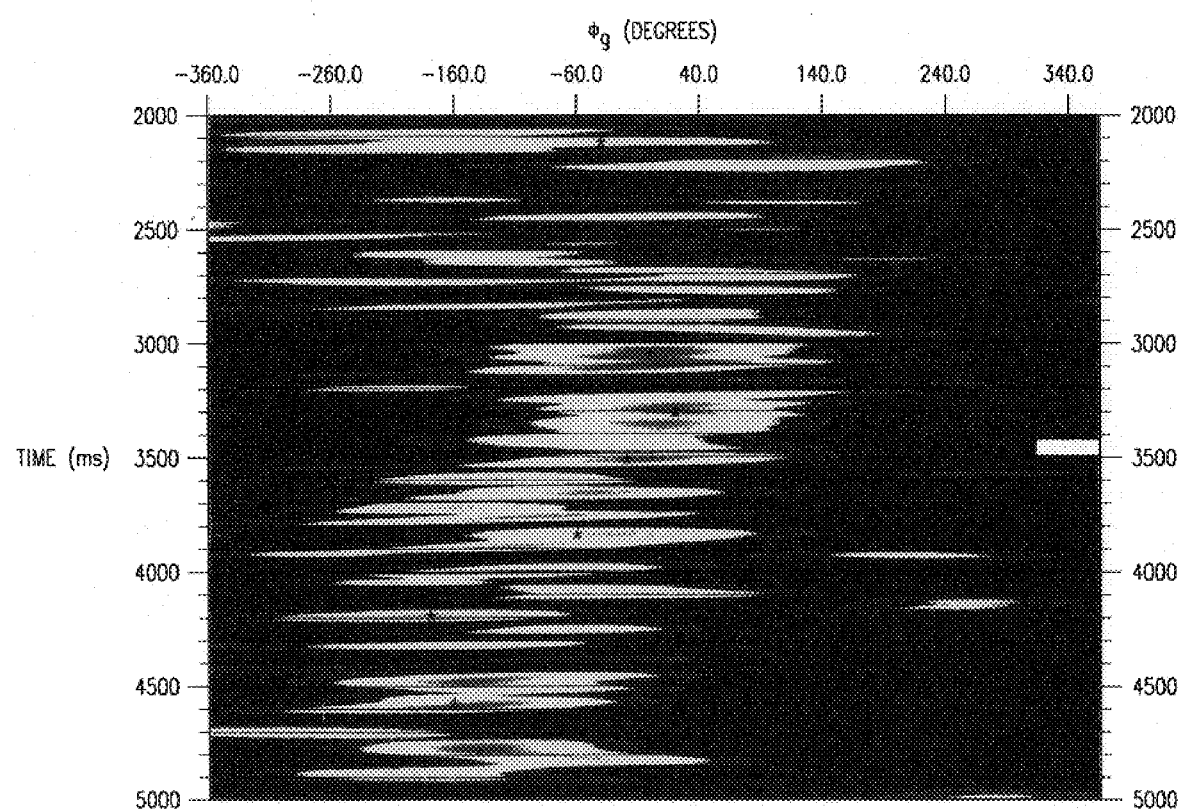
FIG. 9 is an exemplary plot of semblance value versus reference phase angle and normal incidence time for a CMP gather.

FIG. 9 illustrates an exemplary plot of semblance over normal incidence time and reference phase $\phi_{gj}$ for a typical CMP gather. As shown in FIG. 9, the semblance values vary from 0 (blue) to 1 (red) as a function of normal incidence time and of reference phase $\phi_g$. The maxima for each of several discrete normal incidence times, associated with reflectors in the survey, are indicated by asterisks.

Figure 10:
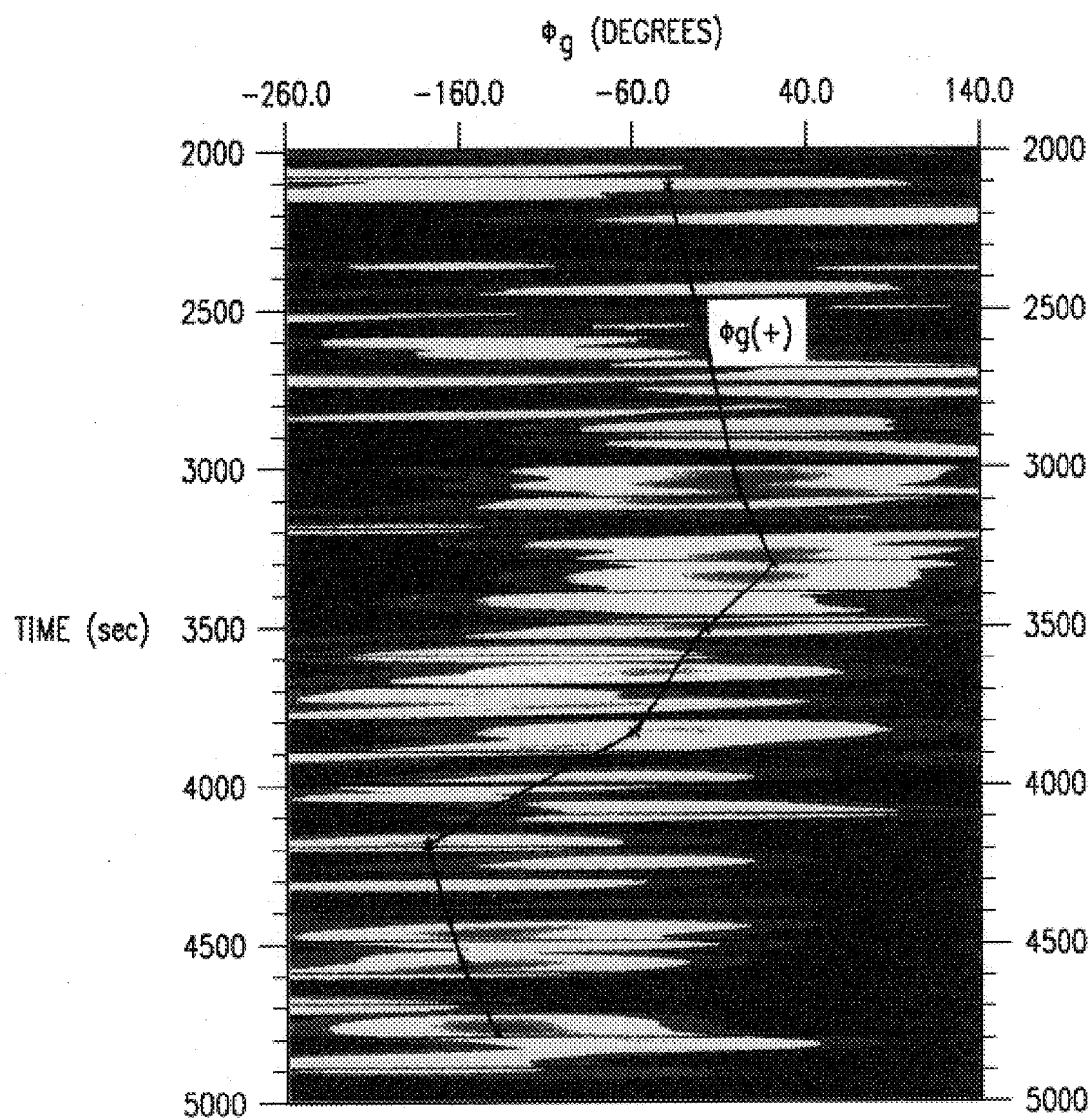
FIG. 10 is an exemplary plot of semblance value versus reference phase angle and normal incidence time for a CMP gather, illustrating an optimum reference phase angle function.

Referring back to FIG. 8, process 68 is next performed by system computer 30 to derive the optimum values of reference phase $\phi_g$ as a function of normal incidence time for the current CMP gather. This may be done merely by linear interpolation between the maxima identified in the semblance plot for the discrete reflectors, generating a spline function of reference phase $\phi_g$ over normal incidence time. FIG. 10 illustrates the optimum reference phase function $\hat{\phi}_g(T_0$ for the CMP gather having the semblance plot of FIG. 9. This optimum reference phase function is then stored by system computer 30 in memory.

Referring back to FIG. 5, process 40 is next performed by system computer, to apply the proper phase correction to each trace in the current CMP gather, using the optimum reference phase angle function derived in process 38. The correction of process 40 may be performed by generating a continuous phase function $\phi_X(t)$ for each trace $S_i(t)$ of offset X, based upon the optimum reference phase function $\hat{\phi}_g(t)$ as follows:

$$\varphi_X(t) = \hat{\varphi}_g(t) \left[ \frac{\Delta T_X}{\Delta T_{Xref}} \right]^\beta$$

where t is set to $T_0$ after NMO correction. This phase correction function is then applied to the NMO-corrected trace $S_i(t)$, in process 40, according to the following rudimentary formula:

$$S'_i(t) = \cos[\phi_X(t)]S_i(t) + \sin[\phi_X(t)][Hi\{S_i(t)\}]$$

where $Hi\{S_i(t)\}$ is the Hilbert transform of the NMO corrected trace $S_i(t)$. It is contemplated that this phase correction may be readily applied by system computer 30 in a digital fashion to the discrete sampled traces $S_i(t)$ to apply the optimum phase shift. Process 40 thus applies the optimum phase correction as a function of normal incidence time to each trace in the CMP gather.

Figure 11A:
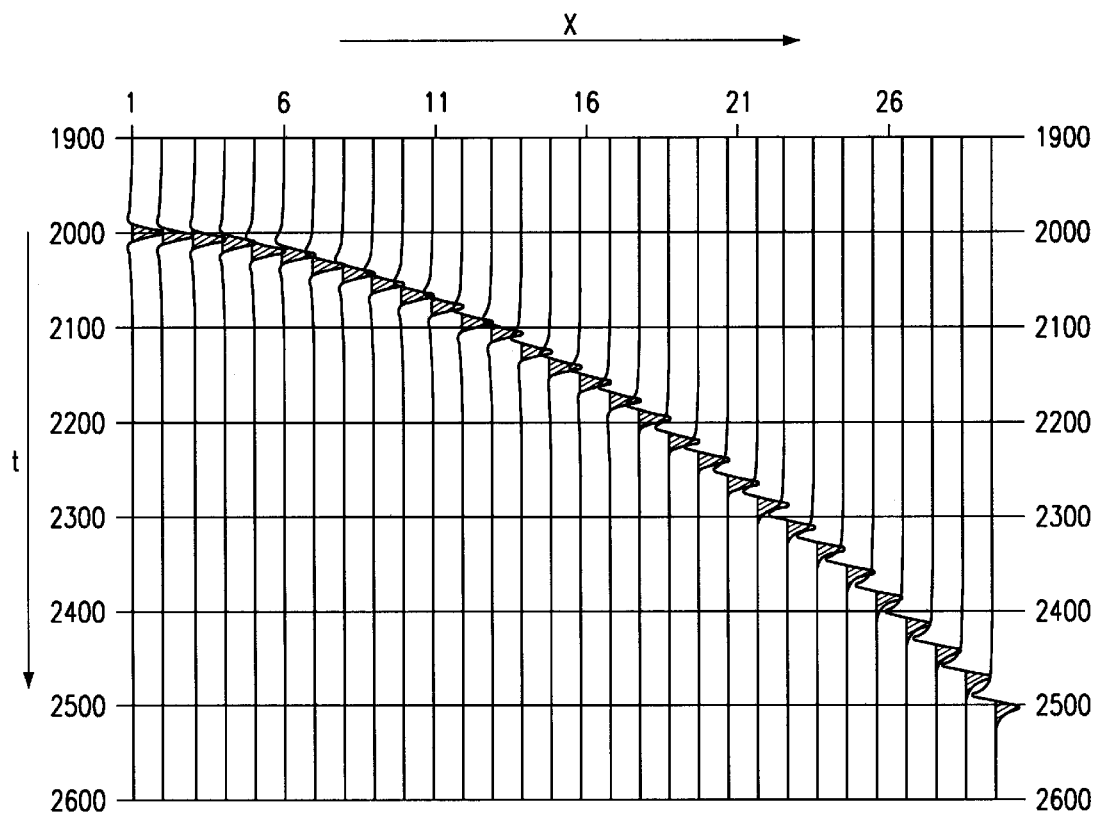
FIGS. 11a and 11b are plots illustrating the time and phase relationship among a CMP gather of traces before and after time and phase correction according to the preferred embodiment of the invention.
Figure 11B:
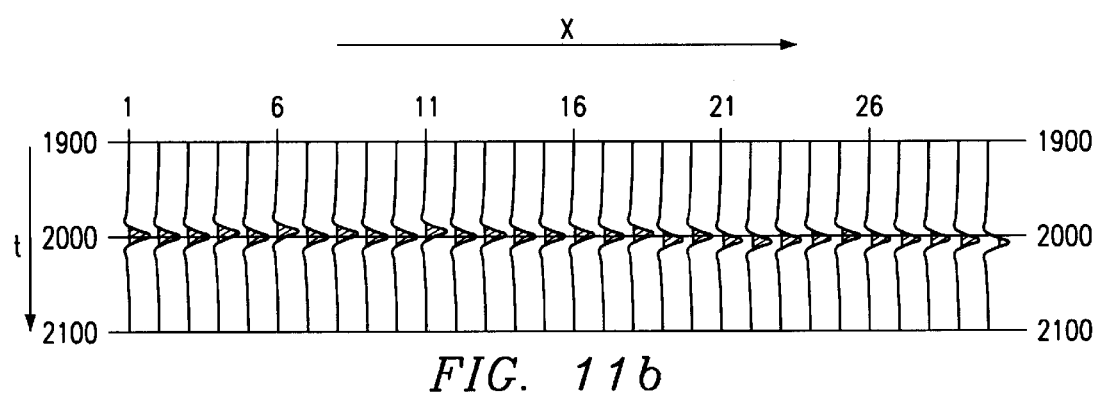

Referring now to FIGS. 11a and 11b, an example of the result of the above-described method according to the preferred embodiment of the invention will now be described. FIG. 11a again illustrates the CMP gather of uncorrected traces previously discussed in FIG. 6, where the traces of increasing offset (increasing x) indicate the same reflection event but at a later time and also with the inclusion of a phase shift. FIG. 11b illustrates the result of the correction of these traces both for NMO (i.e., application of the NMO correction time shift) and also for phase dispersion. As evident in FIG. 11b, the phase shifts that were previously present on the larger offset traces are substantially reduced.

Decision 41 is then performed to determine if additional CMP gathers remain to be similarly processed. If so, system computer 30 retrieves, in process 42, the next CMP gather for processing by processes 34 through 40 in the manner described hereinabove. Upon completion of all of the gathers to be processed (decision 41 is NO), process 44 is then performed to generate the desired seismic survey, in the conventional manner for NMO corrected seismic traces. Process 44 is likely to include the generation of a stack of each CMP gather, to reduce the effects of random noise on the signals. As evident from FIG. 11b, the stacking of the NMO time and phase corrected traces will tend to produce a stronger signal, since the larger offset reflection events will more coherently align with the lower offset signals for the same reflection.

The survey processing of process 44 may also include information determined from the semblance analysis generated in process 38 described hereinabove. One example is to use the semblance analysis in interpretation of the composition of a reflecting stratum. As noted hereinabove relative to the Shapiro et al. reference, layer stratification in formations such as shale and limestone causes anisotropic attenuation of acoustic energy, such that the attenuation of the energy by the formation is dependent upon the angle of incidence. This anisotropy has been found, in connection with the present invention, to result in offset-dependent phase dispersion of the seismic signal, such phase dispersion becoming apparent in the semblance plots described hereinabove.

Figure 8:
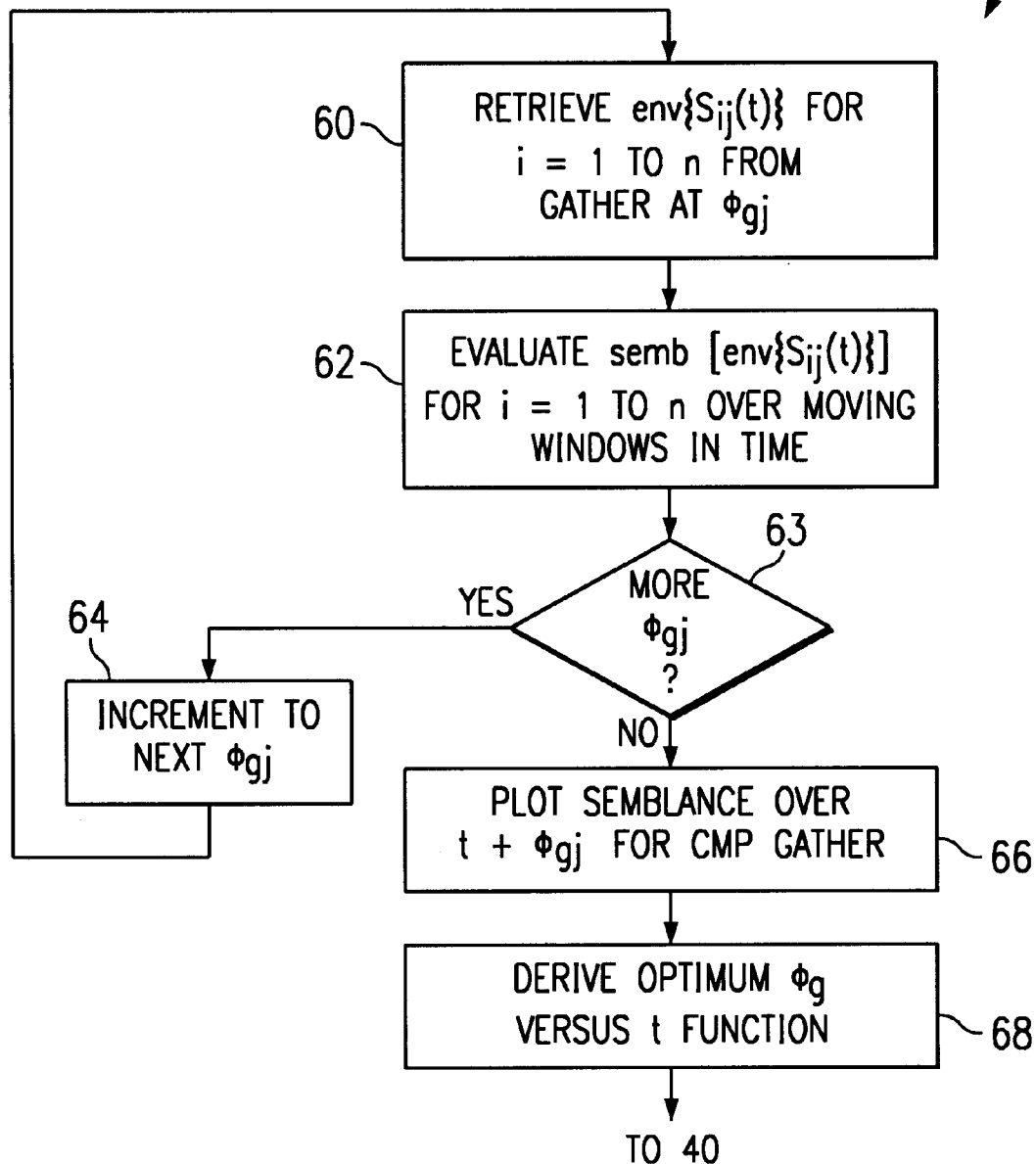
FIG. 8 is a flow chart illustrating the method of performing semblance analysis to select the optimum reference phase over time according to the preferred embodiment of the invention.
Figure 12:
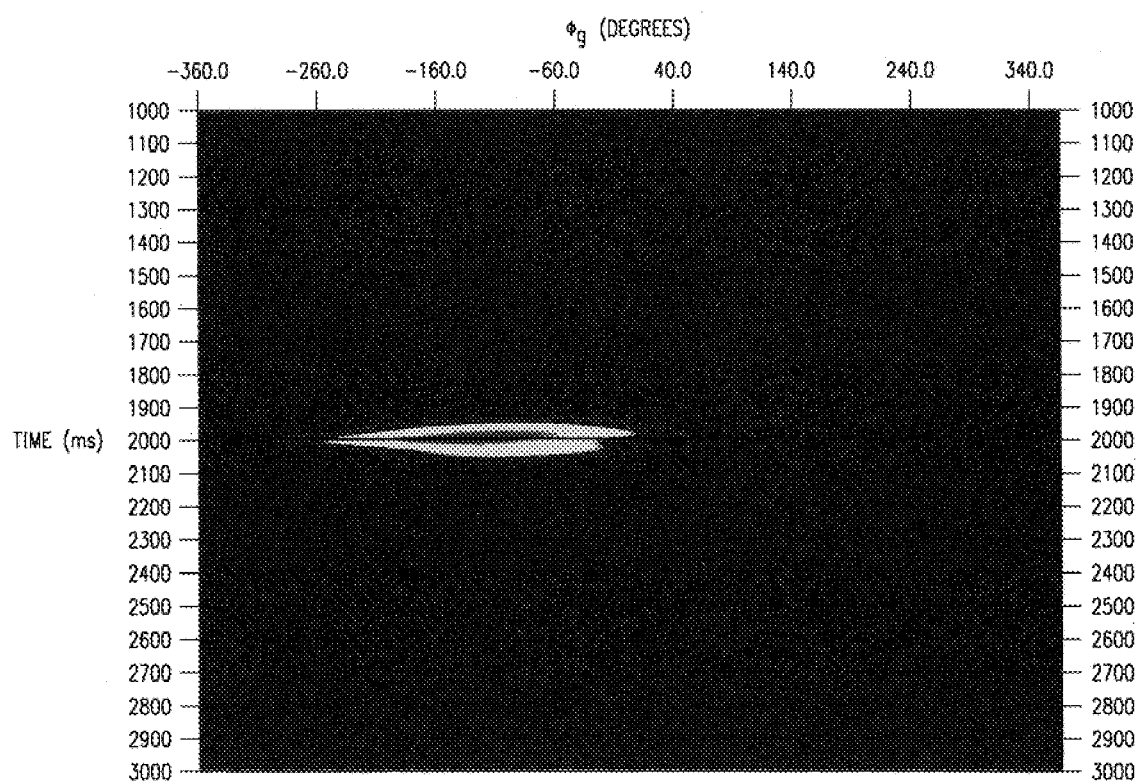
FIG. 12 is a plot of reference phase angle versus normal incidence time for a synthetic CMP gather as used in interpretation according to an alternative embodiment of the invention.

For example, FIG. 12 illustrates a semblance analysis, prepared according to the method described hereinabove relative to FIGS. 5, 7, and 8, upon a synthetic model of a blocked layer model of a reflector at 2 seconds normal incidence time with angle-of-incidence-dependent attenuation, specifically with a Q of 100 for vertically incident (i.e., zero-offset) energy and a Q of 50 for horizontally incident energy. The semblance analysis indicates, in this example, that a reference phase $\phi_g$ of $-70°$ (for a large offset trace) corresponds to the phase dispersion of the reflecting surface, at the reflector appearing at the normal incidence time of 2 seconds. Accordingly, the reference phase $\phi_g$ at a certain reflector may indicate the presence a formation with significant layer stratification, such as a shale or limestone. The semblance information generated in processes 36, 38 may therefore be used in the generation of the seismic survey in process 44, where appropriate.

According to the preferred embodiment of the invention, therefore, phase shifts are applied to each of the traces in the survey to correct for offset-dependent phase dispersion in the seismic signals. Specifically, the optimum reference phase as a function of normal incidence time is used to derive a phase shift function that is applied to each individual trace, according to the ratio of trace offset to reference offset. The application of these optimum phase corrections result in much improved coherence when traces are processed on a gather-wide basis, such as in a stack operation.

Figure 13:
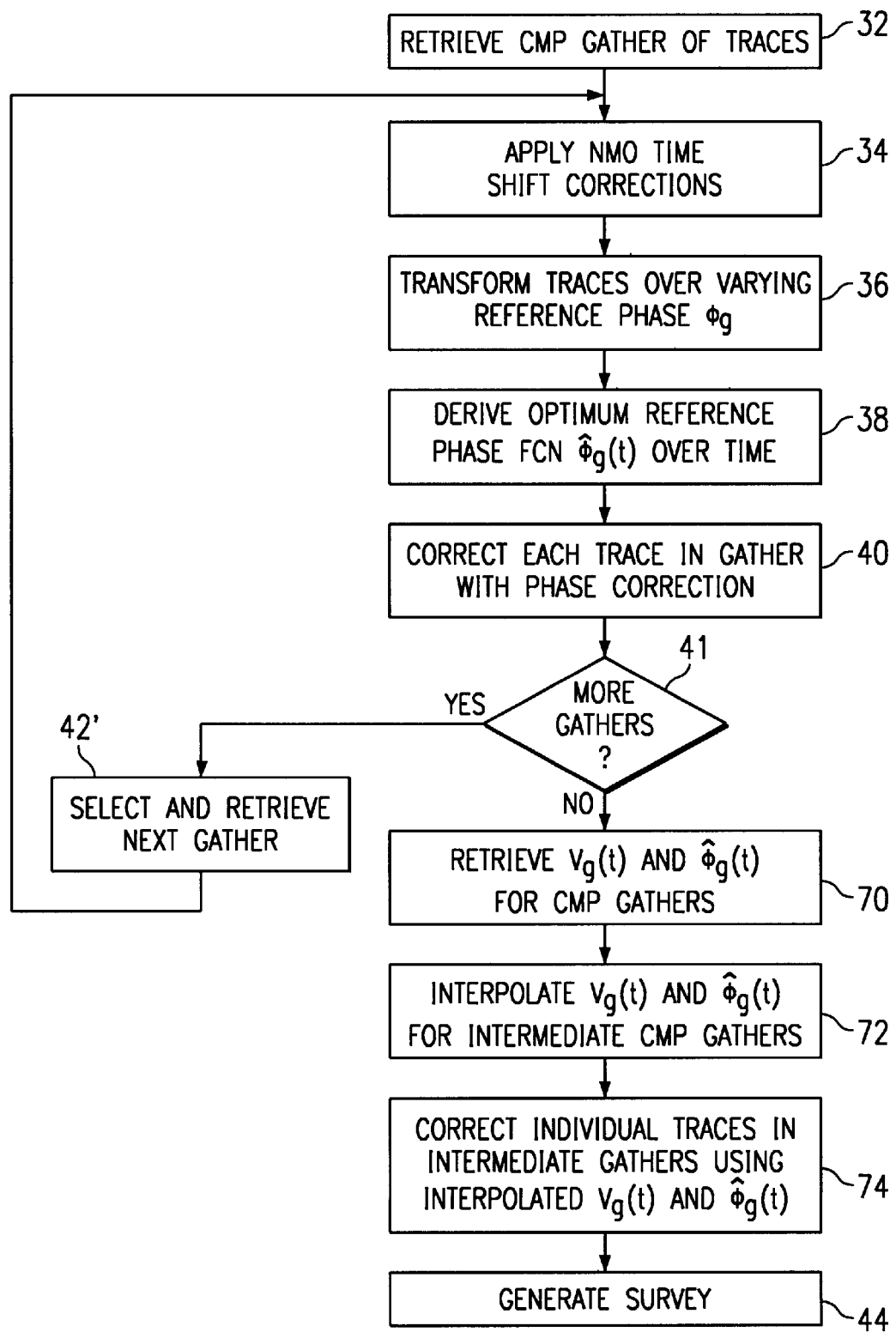
FIG. 13 is a flow chart illustrating a method of generating and applying NMO and phase correction according to an alternative embodiment of the invention.

Referring now to FIG. 13, a method of processing seismic survey signals according to an alternative embodiment of the invention will now be described. Similar steps in FIG. 12 as those described hereinabove relative to FIG. 5 will be referred to by the same reference numerals.

As illustrated in FIG. 13, processes 32 through 41 are performed for a first CMP gather of traces, including the derivation of the optimum reference phase function $\hat{\phi}_g(t)$ and the application of the individual phase shifts to derive traces $S'_i(t)$, as described hereinabove. According to this embodiment of the invention, however, not every available CMP gather is phase-corrected in this manner; instead, only selected CMP gathers, for midpoints spaced apart from one another, are so processed. The NMO and phase dispersion corrections applied to traces in the intermediate gathers will be based upon stacking velocities and reference phase functions that are interpolated from the processed gathers, taking advantage of the relatively smooth rates of change of the formations giving rise to these factors, as in the typical survey. Accordingly, upon decision 41 determining that (with a YES) additional gathers remain to be processed, process 42' is performed to select and retrieve the next gather; this next gather may be associated with a midpoint that is two or more midpoints distant from that of the CMP gather for which phase correction was just completed. This method of phase-correcting CMP gathers in a relatively sparse manner, continues until all of the desired phase corrections are complete (decision 41 returns a NO).

Process 70 is next performed, according to this embodiment of the invention, by system computer 30 retrieving the optimum reference phase functions $\hat{\phi}_g(t)$ and stacking velocities $V_g(t)$ for the CMP gathers for which NMO correction was performed in process 34 and for which phase corrections were applied in process 40. The stacking velocity functions $V_g(t)$ are, as described hereinabove, typically generated by way of a best fit manner in NMO correction process 34.

In process 72, the stacking velocity functions $V_g(t)$ and optimum reference phase functions $\hat{\phi}_g(t)$ for each of those CMP gathers that have not yet been corrected are interpolated from the functions $V_g(t)$, $\hat{\phi}_g(t)$ retrieved in process 70. This interpolation may be a simple linear interpolation based upon the surface distance of the midpoint for the interpolated gather between the midpoints of the corrected gathers, interpolating the values of stacking velocity $V_g$ and optimum reference phase $\hat{\phi}_g$ at common two-way times. Upon the interpolation of these functions, in process 74 system computer 30 corrects each of the individual traces $S_i(t)$ in the interpolated CMP gathers, using the interpolated functions $V_g(t)$, $\hat{\phi}_g(t)$ generated in process 72. The corrections of process 74 are carried out in similar manner as described hereinabove, preferably with NMO correction (as in process 34) performed first, followed by the correction for phase dispersion (performed as described hereinabove relative to process 40). Once each trace has been corrected for normal moveout and for phase dispersion, the survey is generated by system computer 30 in process 44, as described hereinabove.

This alternative embodiment of the present invention will typically be more efficient, as the full phase dispersion corrections need not be derived for each CMP gather in the survey. The accuracy of the interpolated functions $V_g(t)$, $\hat{\phi}_g(t)$ for the interpolated gathers will, of course, be higher in survey regions which are relatively well-behaved and have smooth interfaces.

Each of the embodiments of the present invention described hereinabove provide important advantages in the generation of seismic surveys, as the effects of offset-dependent phase dispersion may be corrected along with the normal moveout correction. Furthermore, the present invention provides the important advantages of optimizing the phase dispersion as a function of normal incidence time, such that the phase dispersion of different reflectors may each be optimized in the gather. In addition, interpretation of the composition of various subsurface strata may also be inferred, at least in part, from the behavior of the phase dispersion functions.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to apply a correction to seismic survey signals corresponding to acoustic energy detected at a plurality of locations of the surface of the earth, such detected energy corresponding to acoustic energy from subsurface geological structures, comprising the steps of:

retrieving, from computer memory, seismic trace data corresponding to a first gather of seismic traces representative of acoustic energy detected at the plurality of surface locations and reflected from a first common depth point, each trace in the first gather having an offset distance;

determining, for a reflection event detected in the seismic trace data for the first gather, a reference phase dispersion angle associated with a reference offset distance;

modifying each seismic trace, in the first gather, with a phase operator based upon the reference phase dispersion angle and a relationship of the offset distance of the trace to the reference offset distance; and storing the modified traces in the computer memory.

2. The method of claim 1, further comprising:

applying normal moveout time-shift corrections to the retrieved seismic traces in the first gather.

3. The method of claim 2, wherein the step of applying moveout time-shift corrections comprises:

generating an envelope trace for each of the retrieved seismic traces in the first gather;

determining a moveout time-shift correction for each trace using the envelope traces; and time-shifting each trace in time by an amount corresponding to the moveout time-shift correction determined for the trace.

4. The method of claim 3, wherein the step of determining a moveout time-shift correction for each trace using the envelope traces comprises:

determining a stacking velocity function over the envelope traces; and for each of the retrieved seismic traces, determining the moveout time-shift correction to the trace responsive to the stacking velocity function and the offset distance of the seismic trace.

5. The method of claim 2, wherein the step of determining a reference phase dispersion angle comprises the steps of:

after the step of applying the normal moveout time-shift corrections, generating a plurality of phase-shifted representations of each trace by applying a plurality of phase angles to each trace in the first gather, each of the plurality of phase angles corresponding to one of a plurality of reference phase dispersion angles, each associated with an associated reference normal moveout time-shift; and selecting, for each reflecting event, an optimal reference phase dispersion value based upon semblance of the phase-shifted representations of a plurality of traces associated with the same reference phase shift value.

6. The method of claim 5, wherein the step of generating a plurality of phase-shifted representations comprises, for each trace in the first gather:

deriving a phase shift angle for the trace corresponding to a product of the reference phase dispersion value and a ratio of a normal moveout time shift of the trace to the reference normal moveout time-shift associated with the reference phase dispersion value;

applying the phase shift angle to the trace; and repeating the deriving and applying steps for each of a plurality of iterated reference phase dispersion values.

7. The method of claim 6, wherein the step of selecting a reference phase dispersion value comprises:

after the step of generating a plurality of phase-shifted representations, determining semblance values over the phase-shifted representations versus time and reference phase dispersion values; and for each reflective event, selecting the reference phase dispersion value corresponding to the highest semblance value.

8. The method of claim 7, wherein the selecting step comprises:

generating a continuous reference phase dispersion function over time.

9. The method of claim 7, wherein the step of determining semblance values comprises:

selecting a time window;

calculating a semblance value based upon cross-correlations of the plurality of phase-shifted representations associated with the same reference phase dispersion value, within the time window; and moving the time window and repeating the calculating step.

10. The method of claim 1, wherein the step of determining a reference phase dispersion angle is performed for a plurality of reflection events in the seismic trace data.

11. The method of claim 10, wherein the step of determining a reference phase dispersion angle is performed as a continuous function of two-way time.

12. The method of claim 1, further comprising:

repeating the retrieving, determining, modifying, and storing steps for a second gather of seismic traces representative of acoustic energy detected at the plurality of surface locations and reflected from a second common depth point.

13. The method of claim 12, further comprising:

determining a reference phase dispersion angle for each reflection event detected in the seismic trace data for a third gather of seismic traces representative of acoustic energy detected at the plurality of surface locations and reflected from a third common depth point, the third common depth point located at the earth between the first and second common depth points, by interpolating the reference phase dispersion angles for corresponding reflection events in the first and second gathers of seismic traces.

14. The method of claim 1, further comprising:

generating a seismic survey from the modified traces.

15. A computer system for correcting seismic survey signals corresponding to acoustic energy detected over time at a plurality of locations of the surface of the earth, such detected energy corresponding to acoustic energy from subsurface geological structures, comprising:

a computer memory for storing seismic trace data arranged as a plurality of traces of seismic survey signals;

an output device, for presenting the corrected seismic survey signals to a human user;

a system computer, coupled to the computer memory and to the output device, programmed to perform the operations of:

retrieving, from the computer memory, seismic trace data corresponding to at least one gather of traces representative of acoustic energy detected at the plurality of surface locations and reflected from a first common depth point, each trace in each gather having an offset distance;

determining, for a reflection event detected in the seismic trace data for each gather, a reference phase dispersion angle associated with a reference offset distance;

modifying each trace, in each gather, with a phase operator based upon the reference phase dispersion angle and a relationship of the offset distance of the trace to the reference offset distance; and storing the modified traces in the computer memory.

16. The system of claim 15, wherein the computer is further programmed to perform the operation of:

applying normal moveout time-shift corrections to the retrieved traces in each gather.

17. The system of claim 16, wherein the computer is programmed to perform the step of applying moveout time-shift corrections by performing the operations of:

generating an envelope trace for each of the retrieved traces in each gather;

determining a moveout time-shift correction for each trace using the envelope traces;

time-shifting each trace in time by an amount corresponding to the moveout time-shift correction determined for that trace; and storing the time-shifted traces in memory.

18. The system of claim 17, wherein the computer is programmed to perform the step of determining a moveout time-shift correction by performing the operations of:

determining a stacking velocity function over the envelope traces; and for each of the retrieved traces, determining the moveout time-shift correction to the trace responsive to the stacking velocity function and the offset distance of the trace.

19. The system of claim 15, wherein the computer is programmed to determine a reference phase dispersion angle for each of a plurality of reflection events by performing the operations of:

after the step of applying the normal moveout time-shift corrections, generating a plurality of phase-shifted representations of each trace by applying a plurality of phase angles to each trace in each gather, each of the plurality of phase angles corresponding to one of a plurality of reference phase dispersion angles associated with a reference normal moveout time-shift; and selecting, for each reflecting event, a reference phase dispersion value based upon semblance of the phase-shifted representations of a plurality of traces in the same gather associated with the same reference phase shift value.

20. The system of claim 19, wherein the computer is programmed to generate the plurality of phase-shifted representations by performing, for each trace:

deriving a phase shift angle for the trace corresponding to a product of the reference phase dispersion value and a ratio of a normal moveout time-shift of the trace to the reference normal moveout time-shift;

applying the phase shift angle to the trace; and repeating the deriving and applying steps for each of a plurality of iterated reference phase dispersion values.

21. The system of claim 20, wherein the computer is programmed to select a reference phase dispersion value for the plurality of reflective events, by performing operations comprising:

after the step of generating a plurality of phase-shifted representations, determining semblance values over the phase-shifted representations versus time and reference phase dispersion values; and for each of the plurality of reflective events, selecting the reference phase dispersion value corresponding to the highest semblance value.

22. The system of claim 21, wherein the computer selects the reference phase dispersion value for each reflective event by performing the operation of:

generating a continuous reference phase dispersion function over time.

23. The system of claim 21, wherein the computer determines semblance values by performing operations comprising, for each of the at least one gathers:

selecting a time window;

calculating a semblance value based upon cross-correlations of the plurality of transform representations associated with the same reference phase dispersion value, within the time window; and moving the time window and repeating the calculating step.

24. The system of claim 15, wherein the computer is further programmed to perform the operations of:

performing the retrieving, determining, modifying, and storing steps for first and second gathers of traces; and determining a reference phase dispersion angle for each reflection event detected in the seismic trace data for a third gather of traces representative of acoustic energy detected at the plurality of surface locations and reflected from a third common depth point, the third common depth point located at the earth between first and second common depth points associated with the first and second gathers, by interpolating the reference phase dispersion angles for corresponding reflection events in the first and second gathers of traces.

25. The system of claim 15, further comprising:

an output device, coupled to the computer, for displaying a seismic survey based upon the modified traces.

* * * * *